United States Patent Office 2,904,567
Patented Sept. 15, 1959

2,904,567

TELOMER ACID PROCESS

William S. Barnhart, Cranford, and Robert H. Wade, West Paterson, N.J., assignors, by mesne assignments, to Minnesota Mining and Manufacturing Company, St. Paul, Minn., a corporation of Delaware No Drawing. Application August 28, 1956
Serial No. 606,568

7 Claims. (Cl. 260—408)

This invention relates to an improved process for the preparation of telomer acids.

In copending application Serial No. 452,705, filed August 27, 1954, there is disclosed a new class of telomer acids which are prepared by the hydrolysis of perhalogenated telomers, the telomers being prepared by the telomerization of perhalogenated monomers such as chlorotrifluoroethylene, tetrafluoroethylene, and unsymmetrical dichlorodifluoroethylene with telogens such as sulfuryl chloride, sulfuryl bromide, fluorosulfuryl chloride and bromosulfuryl chloride. The hydrolysis of co-telomers of the foregoing monomers with such comonomers as symmetrical dichlorodifluoroethylene and vinylidene fluoride is also disclosed.

The preferred telomer acids are monoacids having the formula.

$$Cl(CF_2-CFCl)_{n-1}CF_2COOH$$

and diacids having the formula $$HOOCCF_2(CF_2-CFCl)_{n-2}CF_2COOH$$

in which $n$ is an integer from 2 to 16, these acids being produced by the hydrolysis of the telomerization product of chlorotrifluoroethylene with sulfuryl chloride, the telomer having the formula $$Cl(CF_2CFCl)_nCl$$

in which $n$ is as given above.

The telomer acids have many uses such as emulsifiers in aqueous polymerization systems as disclosed in copending application Serial No. 463,073, filed October 18, 1954, and also have many other uses as surfactants, as disclosed in copending application Serial No. 526,537, filed August 4, 1955.

Generally speaking, the telomer monoacids are more desirable than are the diacids due to the greater number of uses existing for the monoacids, and, in accordance with the present invention, a process is provided wherein the ratio of monoacid to diacid formed in the hydrolysis product is higher than that previously attainable. Both mono- and diacids are formed in the hydrolysis product but it is desirable to maintain the quantity of diacid formed as low as possible. The desirable results of the invention, i.e., the increase of mono-to diacid ratio in the product, are obtained by the addition of a telomer mono- or diacid to the reaction mixture as an emulsifier before reaction is initiated. The particular mono- or diacid used can be any of the $C_4$ to $C_{32}$ telomer acids.

In the process of the invention, a perhalogenated telomer, such as the telomer obtained from the telomerization of polychlorotrifluoroethylene with sulfuryl chloride, oleum, and a telomer mono- or diacid are charged to a reactor and maintained at an elevated temperature and pressure until the reaction is complete. The quantity of oleum charged to the reactor may be in the range of about 2 to 10 moles per mole of telomer and the oleum may have a concentration in the range of about 1 to 70 percent free sulfur trioxide, although it is preferred to use oleum having a concentration in the range of about 1 to 20 percent free sulfur trioxide. The telomer acid emulsifier is added in a concentration of about 1 to 10 percent by weight, preferably about 2 to 5 percent by weight based upon the reaction mixture.

The temperature of reaction is in the range of 175 to 250° C., preferably 180 to 240° C. The use of the telomer acid emulsifier permits a lower reaction temperature than heretofore since the optimum reaction temperature previously was about 220° C. whereas with the use of an emulsifier a satisfactory reaction rate is obtained at 200° C. The reaction time may be between about 15 and 40 hours, but the highest yield of desired products are obtained when operating at a temperature of 200° C. for a period of 24 hours. The reaction pressure may be in the range of about atmospheric to 150 p.s.i.g. and is preferably in the range of about 30 p.s.i.g. to 125 p.s.i.g. The pressure can also be varied for other purposes, for example, to cause certain products such as chlorosulfonic acid to remain in the reaction mixture or to permit it to distill.

At the completion of the reaction period, the reaction mixture is cooled to a temperature of about 120° C. or lower by indirect heat exchange and is transferred to a drowning tank where it is cooled and diluted with water to effect the separation of a product layer and an aqueous sulfuric acid layer. The cooling and dilution of the reaction mixture is conveniently effected by the addition of ice thereto, with or without additional water.

Cooling and dilution of the reaction mixture constitutes a simple and effective means for the separation of the desired telomer acid product layer from the sulfuric acid layer since the solubility of telomer acids in dilute sulfuric acid, having a concentration in the range of about 30 to 70 percent by weight, is very low.

The sulfuric acid layer may be extracted with a solvent such as benzene, carbon tetrachloride, or other halogenated methylenes or ethylenes, in order to recover whatever small quantities of dissolved telomer acids may remain in the sulfuric acid layer, and the extract may then be added to the product layer.

The product and extract layers are then transferred to a wash tank where they are washed with dilute sulfuric acid and, from the wash tank, the mixed telomer acids are transferred to an acid still where they are distilled to recover the various products of the process. From the acid still, telomer diacids are recovered as bottoms fractions while telomer monoacid is recovered as an overhead fraction, the final distillation being performed at a reduced pressure in the range of 1 to 100 mm. Hg. absolute.

The improved process of the invention is most practical when the mono- or diacid emulsifier has the same carbon content as the telomer being hydrolyzed as this contingency allows the emulsifier and product to be collected together since they are identical. If the emulsifier has a different carbon content than the telomer, then the problem of separating the two remains.

The high yield of monoacid relative to the yield of diacid obtained using an emulsifier may be the result of several factors. The emulsifier provides better contact between the telomer and oleum thereby increasing the rate of reaction. This rate factor in conjunction with a lower reaction temperature apparently favors the production of monoacid. The mechanism of diacid formation may proceed from the monoacid through an isomerization step followed by or simultaneous with hydrolysis as indicated by the following:

$$CF_2ClCFClCF_2CFClCF_2COX \longrightarrow$$
$$CFCl_2CF_2CF_2CFClCF_2COX$$
$$\downarrow H_2SO_4$$
$$XOCCF_2CF_2CFClCF_2COX$$
$$\downarrow H_2O$$
$$HO_2CCF_2CF_2CFClCF_2CO_2H$$

wherein X=Cl or F.

The advantages of adding a telomer acid as an emulsifier to a process which produces telomer acid may be explained by the following equation:

$$RCX_3 + H_2SO_4 \longrightarrow RCOX + HX + XSO_3H \xrightarrow{HOH} RCO_2H$$

since if this equation correctly describes the reaction course, the final telomer acid product is obtained only at the end of the reaction when the mixture is diluted with water as this step converts the telomer acid halide to the telomer acid. From this, it can be assumed that the telomer acid is superior to the telomer acid halide as an emulsifier.

The invention will be further illustrated by reference to the following specific examples:

EXAMPLE 1

A series of weight balance variable studies was conducted to evaluate the use of catalysts, emulsifiers and favorable time-temperature relationships for maximum monoacid production. The equipment consisted of a 1 liter, single-necked flask fitted for stirring and the distillation of low boiling by-products as formed. In each experiment 1.3 moles of tetramer, having the formula $Cl(CF_2-CFCl)_4Cl$, and a 5 to 1 mole ratio of 5 percent oleum, were used in each experiment. Three runs are summarized below, and Experiment 1 gave no improvement in the conversion ratio using a reaction temperature of 180° C. and a reaction time of 48 hours. In the second experiment, the use of copper sulfate catalyst, a reaction temperature of 200° C. and a reaction time of 24 hours actually gave less conversion to acids than a similar run without the addition of the salt; the conversion ratio improvement was negligible. The third experiment was run with the addition of 70 grams of diacid to facilitate telomer-sulfuric acid contact; a good conversion to monoacid and a much improved conversion ratio was obtained.

*Table 1*

| Expt. | 1 | 2 | 3 |
|---|---|---|---|
| Time (hrs.) | 48 | 24 | 24 |
| Temperature (° C.) | 180 | 200 | 200 |
| Additive | none | (¹) | (²) |
| $Cl(CF_2-CFCl)_4Cl$ (Recovery): | | | |
| grams | 274 | 301 | 149 |
| moles | 0.508 | 0.559 | 0.278 |
| moles used | 0.809 | 0.751 | 1.029 |
| $Cl(CF_2-CFCl)_3CF_2COOH$: | | | |
| grams | 296 | 259 | 393 |
| moles | 0.619 | 0.540 | 0.821 |
| percent conversion | 47.0 | 41.2 | 62.8 |
| percent yield | 76.5 | 71.9 | 79.8 |
| $HOOCCF_2(CF_2-CFCl)_2CF_2COOH$: | | | |
| grams | 73.8 | 52.5 | 45.2 |
| moles | 0.168 | 0.120 | 0.103 |
| percent conversion | 12.8 | 9.2 | 7.9 |
| percent yield | 20.8 | 16.0 | 10.0 |
| Total: | | | |
| moles | 1.295 | 1.219 | 1.202 |
| percent conversion | 59.8 | 50.4 | 70.7 |
| percent yield | 97.3 | 87.9 | 89.8 |
| percent recovery | 98.4 | 93.9 | 92.0 |
| Ratio: Conversion to monoacid/Conversion to diacid | 3.68 | 4.48 | 7.95 |

¹ 5 g. $CuSO_4$.
² 70 g. $HOOCCF_2(CF_2-CFCl)_2CF_2COOH$.

EXAMPLE 2

Additional studies were made using a 25 gallon stainless steel autoclave. In Table 2 are summarized the operating conditions, reactants, products, conversions, and yields obtained in these runs. The telomer was tetramer having the formula $Cl(CF_2-CFCl)_4Cl$. From these data it is apparent that in the second run, in which a telomer monoacid was used as an emulsifier, the ratio of mono- to diacid was greatly increased.

*Table 2*
TELOMER ACID STUDIES

| Run No. | 1 | 2 |
|---|---|---|
| Telomer | Tetramer | Tetramer |
| Kg | 67.0 | 56.8 |
| moles | 124.8 | 106 |
| 101% $H_2SO_4$ kg | 65.0 | 57.7 |
| Emulsifier | none | (¹) |
| Kg | | 1.6 |
| Pressure, p.s.i.g | 60 | 90 |
| Time, hrs | 24 | 24 |
| Temp., ° C | 220 | 200 |
| Product: | | |
| Telomer, kg | 8.6 | 10.7 |
| moles | 16.0 | 20.0 |
| Monoacid, kg | 25.9 | 32.6 (−1.6) |
| moles | 54.2 | 64.6 |
| Diacid, kg | 14.4 | 5.8 |
| moles | 32.8 | 13.2 |
| Conversion, percent: | | |
| Monoacid | 43.7 | 61.0 |
| Diacid | 26.3 | 12.5 |
| Total | 70.0 | 73.5 |
| Yield, percent: | | |
| Monoacid | 50.1 | 75.0 |
| Diacid | 30.2 | 15.3 |
| Total | 80.3 | 90.3 |
| Recovery, mole percent | 82.6 | 92.3 |
| Ratio, mono-/diacid | 1.66 | 4.88 |

¹ $Cl(CF_2-CFCl)_3CF_2COOH$.

It will be obvious to those skilled in the art that many modifications may be made within the scope of the present invention without departing from the spirit thereof, and the invention includes all such modifications. This application is a continuation-in-part of our prior and copending application S.N. 452,703, now U.S. 2,806,865 and S.N. 452,705, now U.S. 2,806,866.

We claim:
1. An improved process for the preparation of a perhalogenated carboxylic acid which comprises treating with fuming sulfuric acid at a temperature between about 175° C. and about 250° C. a fluorine containing telomer of the formula $Cl(CF_2CFCl)_nCl$ where $n$ is an integer from 2 to 16 in the presence of an added amount of said perhalogenated carboxylic acid, cooling the reaction mixture and subsequently treating the reaction product with water and recovering the acid produced.
2. The process of claim 1 wherein the perhalogenated carboxylic acid is a monocarboxylic acid.
3. The process of claim 1 wherein the perhalogenated carboxylic acid is a dicarboxylic acid.
4. An improved process for the preparation of a perhalogenated carboxylic acid which comprises treating with fuming sulfuric acid at a temperature between about 175° C. and about 250° C. and at a pressure in the range of about 5 to 125 p.s.i.g. $Cl(CF_2CFCl)_nCl$ where $n$ is an integer from 2 to 16 in the presence of a prehalogenated acid of the formula

$$Cl(CF_2-CFCl)_{n-1}CF_2COOH$$

in which $n$ is as above, cooling the reaction mixture and subsequently treating the reaction product with water and recovering the acid produced.
5. The process of claim 4 wherein $n$ is 3.
6. The process of claim 4 wherein $n$ is 4.
7. A process which comprises charging to a reactor (a) perhalogenated telomer having the formula $$Cl(CF_2-CFCl)_nCl$$

where $n$ is an integer from 2 to 16, (b) oleum and (c) an emulsifier selected from the group consisting of perhalogenated monoacids having the formula $$Cl(CF_2-CFCl)_{n-1}CF_2COOH$$

in which $n$ is as given above, and diacids having the formula $HOOCCF_2(CF_2-CFCl)_{n-2}CF_2COOH$ in which $n$ is as given above; thereafter reacting the aforementioned materials at a temperature between about 175° C. to about 250° C.; cooling the reaction mixture; and subsequently treating the reaction product with water and recovering said reaction product.

References Cited in the file of this patent

UNITED STATES PATENTS

| | | |
|---|---|---|
| 2,766,215 | Stoops et al. | Oct. 9, 1956 |
| 2,806,865 | Barnhart et al. | Sept. 17, 1957 |
| 2,806,866 | Barnhart et al. | Sept. 17, 1957 |

OTHER REFERENCES

MacArdle: The Use of Solvents in Organic Chemistry, pp. 1 and 2 (1925), D. Van Nostrand Co., New York.